United States Patent [19]
Wu

[11] Patent Number: 5,651,470
[45] Date of Patent: Jul. 29, 1997

[54] VACUUM CONTAINER

[76] Inventor: Benemon Wu, P.O. Box 1032, Tainan, Taiwan

[21] Appl. No.: 697,488

[22] Filed: Aug. 26, 1996

[51] Int. Cl.$^6$ .............. B65D 41/56; B65D 51/26; B65D 51/28; B65D 51/30; B65D 51/32

[52] U.S. Cl. .............. 220/212; 220/231; 220/240; 215/228; 215/262; 215/270; 206/524.8; 141/65; 99/454; 99/472; 417/545

[58] Field of Search .............. 220/212, 231, 220/240; 215/228, 260, 262, 270; 141/65; 206/524.8; 99/454, 472; 417/544, 545

[56] References Cited

U.S. PATENT DOCUMENTS

| | | |
|---|---|---|
| 5,398,811 | 3/1995 | Latella, Jr. .............. 206/524.8 |
| 5,406,992 | 4/1995 | Miramon .............. 141/65 |
| 5,469,979 | 11/1995 | Chiou .............. 215/228 |
| 5,546,997 | 8/1996 | Miramon .............. 141/65 |
| 5,558,243 | 9/1996 | Chu .............. 220/212 |
| 5,564,480 | 10/1996 | Chen .............. 141/65 |
| 5,564,581 | 10/1996 | Lin .............. 215/228 |

*Primary Examiner*—Stephen K. Cronin

[57] ABSTRACT

A vacuum container has a vessel and an installed air extraction device covering the vessel. The installed air extraction device has a cap, an air extraction device disposed in the cap, and an air inlet valve passing through a center of the cap. The cap has an inner cover, an outer cover, and a hollow interior defined between the inner cover and the outer cover. An inner sleeve extends downward from the center portion of the outer cover. A spring encloses the middle portion of the air inlet valve. Another spring encloses the inner sleeve.

2 Claims, 10 Drawing Sheets

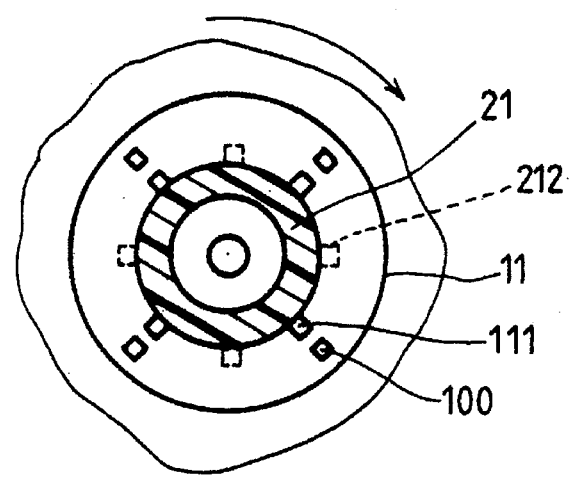
F I G. 7
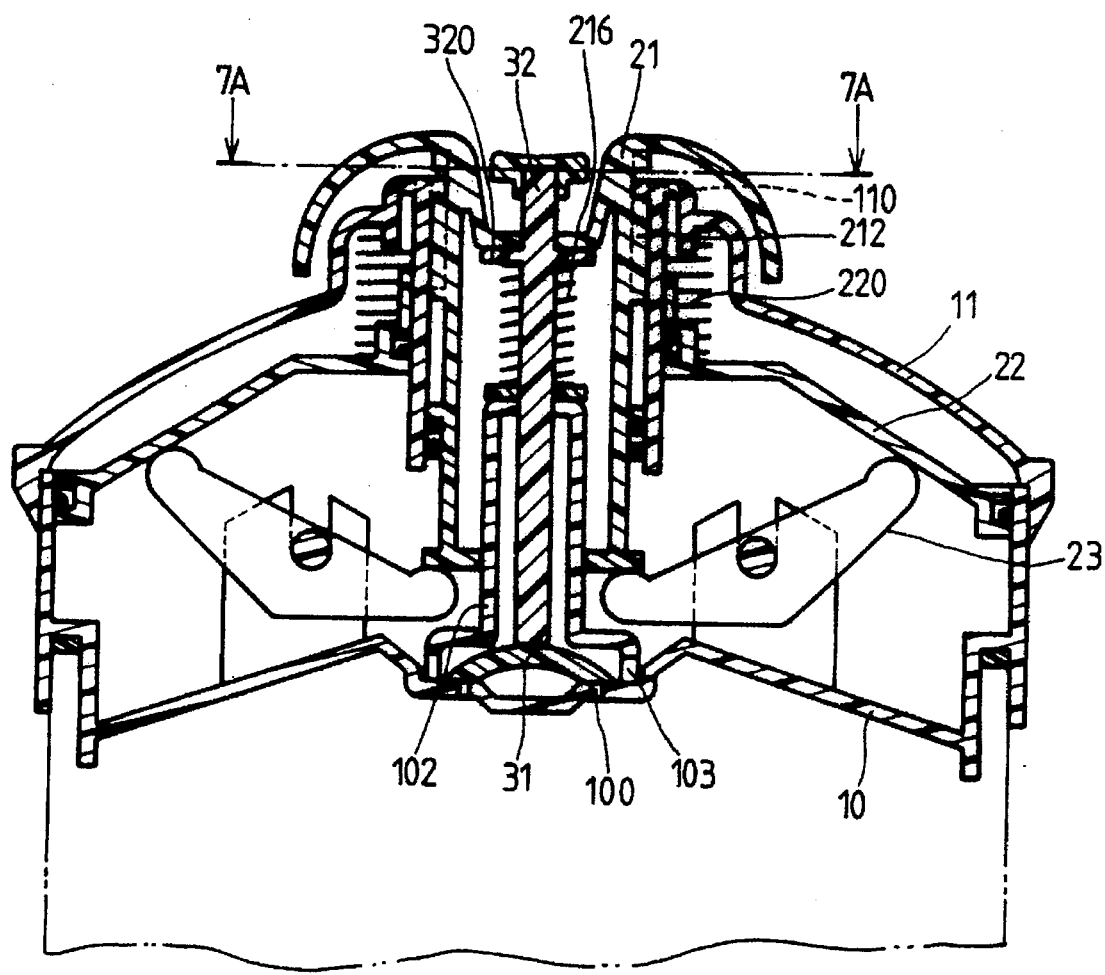
F I G. 4

VACUUM CONTAINER

BACKGROUND OF THE INVENTION

The invention relates to a vacuum container. More particularly, the invention relates to a vacuum container which has an air extraction device to extract the air in the vacuum container very fast.

There are two types of conventional vacuum containers. The first type vacuum container has a separated air extractor. The user has to hold the air extractor while the air extractor is in operation. Since the air extractor should be detached while the air extractor is in operation, the separated air extractor will occupy a room of storage. The second type vacuum container has an installed air extractor. Since the extracted air is confined in a very small interior of the installed air extractor, it will consume a long period of time to extract all the air in the vacuum container completely.

SUMMARY OF THE INVENTION

An object of the invention is to provide a vacuum container which has an installed air extraction device to extract the air in the vacuum container very fast.

Another object of the invention is to provide a vacuum container with an installed air extraction device which has a steady center of gravity while operating.

Accordingly, a vacuum container comprises a vessel and an installed air extraction device covering the vessel. The installed air extraction device has a cap, an air extraction device disposed in the cap, and an air inlet valve passing through a center of the cap. The cap has an inner cover, an outer cover, and a hollow interior defined between the inner cover and the outer cover. An extending sleeve extends downward from a periphery edge of the outer cover to enclose an upper rim of the vessel. A plurality of first vents are formed on a center portion of the inner cover. A plurality of third vents are formed on a center portion of the outer cover. A plurality of grooves are formed on the outer cover near the corresponding first vents. An inner sleeve extends downward from the center portion of the outer cover. The air extraction device has a hollow press plate disposed on a top of the outer cover, a cylinder seat extending downward from the hollow press plate, a lower disk disposed at a bottom of the cylinder seat, a lining cap flaring downward from the cylinder seat to the extending sleeve, a retaining ring surrounding an upper portion of the cylinder seat, a plurality of ribs extending upward from the retaining ring to abut a periphery of the cylinder seat, and a plurality of guide blocks disposed beneath the hollow press plate to face the corresponding ribs. Two slide blocks are disposed between the inner cover and the lining cap pivotally. Each of the slide blocks has a first end contacting the lining cap and a second end contacting the lower disk. A first recess ring surrounds the cylinder seat. The first recess ring has a recess to receive a first choke ring. The first choke ring contacts the inner sleeve. A plurality of first air passages pass through the first recess ring. A hollow tube extends upward from the lower disk. A first spring is disposed between the hollow press plate and the hollow tube. A plurality of second vents are formed on a lower portion of the hollow tube. A second spring is disposed between the outer cover and the lining cap to surround the inner sleeve. A second recess ring is formed in an upper inner periphery of the lining cap. The second recess ring has a recess to receive a second choke ring. The second choke ring contacts the inner sleeve. A plurality of second air passages pass through the second recess ring. A third recess ring is formed on an outer rim of the lining cap. The third recess ring has a recess to receive a third choke ring. The third choke ring contacts the extending sleeve. A plurality of third air passages pass through the third recess ring. Two support plates extend upward from the inner cover to support the corresponding slide blocks pivotally. Each of the ribs has two first bevels to form an upper end. The ribs are inserted in the corresponding grooves. Each of the guide blocks has two second bevels to form a lower end. The hollow press plate has a periphery flap. A check ring is disposed beneath the hollow press plate. The air inlet valve has a plug plate disposed in a bottom end of the hollow tube and a push bar passing through the hollow press plate and the check ring to be inserted in the hollow tube. The check ring contacts the first spring. The hollow press plate is pressed downward to drive the first spring to move downward and the first choke ring to move downward. The first choke ring blocks a spacing between the inner sleeve and the first recess ring. The ribs moves downward along the corresponding grooves. The second end of each of the slide blocks moves downward. The first end of each of the slide blocks moves downward to push the lining cap upward. The second choke ring blocks a gap between the inner sleeve and the second recess ring. The third choke ring blocks an interval between the extending sleeve and the third recess ring. The check ring blocks a clearance between the hollow press plate and the push bar. An upward motion of the lining cap produces a suction for the air in the vessel. The air in the vessel passes through the first vents to push the plug plate upward. The air enters the hollow interior via the second vents. The plug plate plugs the first vents while the vessel is in vacuum.

BRIEF DESCRIPTION OF THE DRAWINGS

FIG. 4 is a sectional view of a press plate which is pressed down to the utmost;

FIG. 7 is a partially sectional view taken along line 7A—7A in FIG. 4;

DETAILED DESCRIPTION OF THE INVENTION

Figure 1:
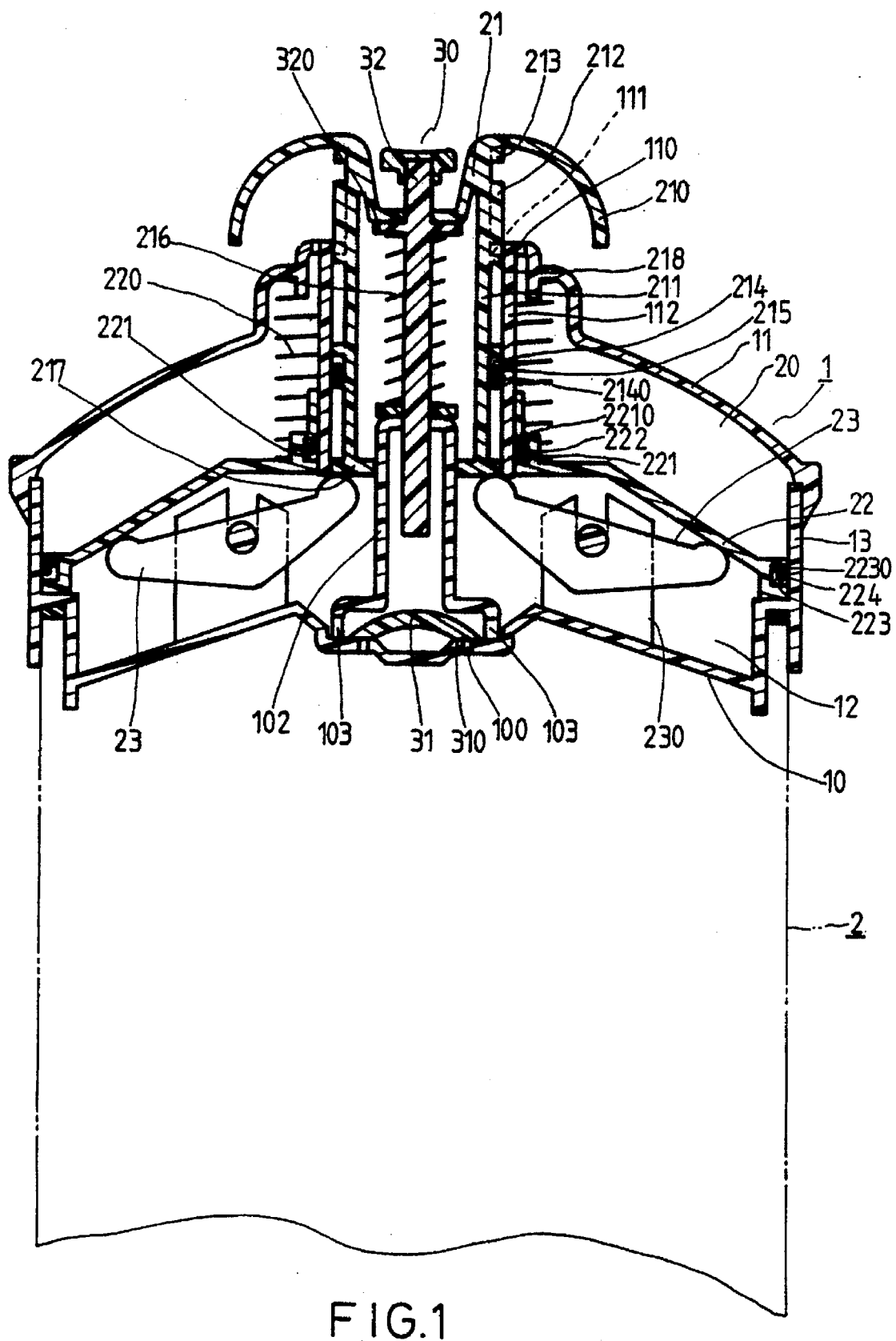
FIG. 1 is a sectional assembly view of a vacuum container of a preferred embodiment while a press plate is not in operation.
Figure 8:
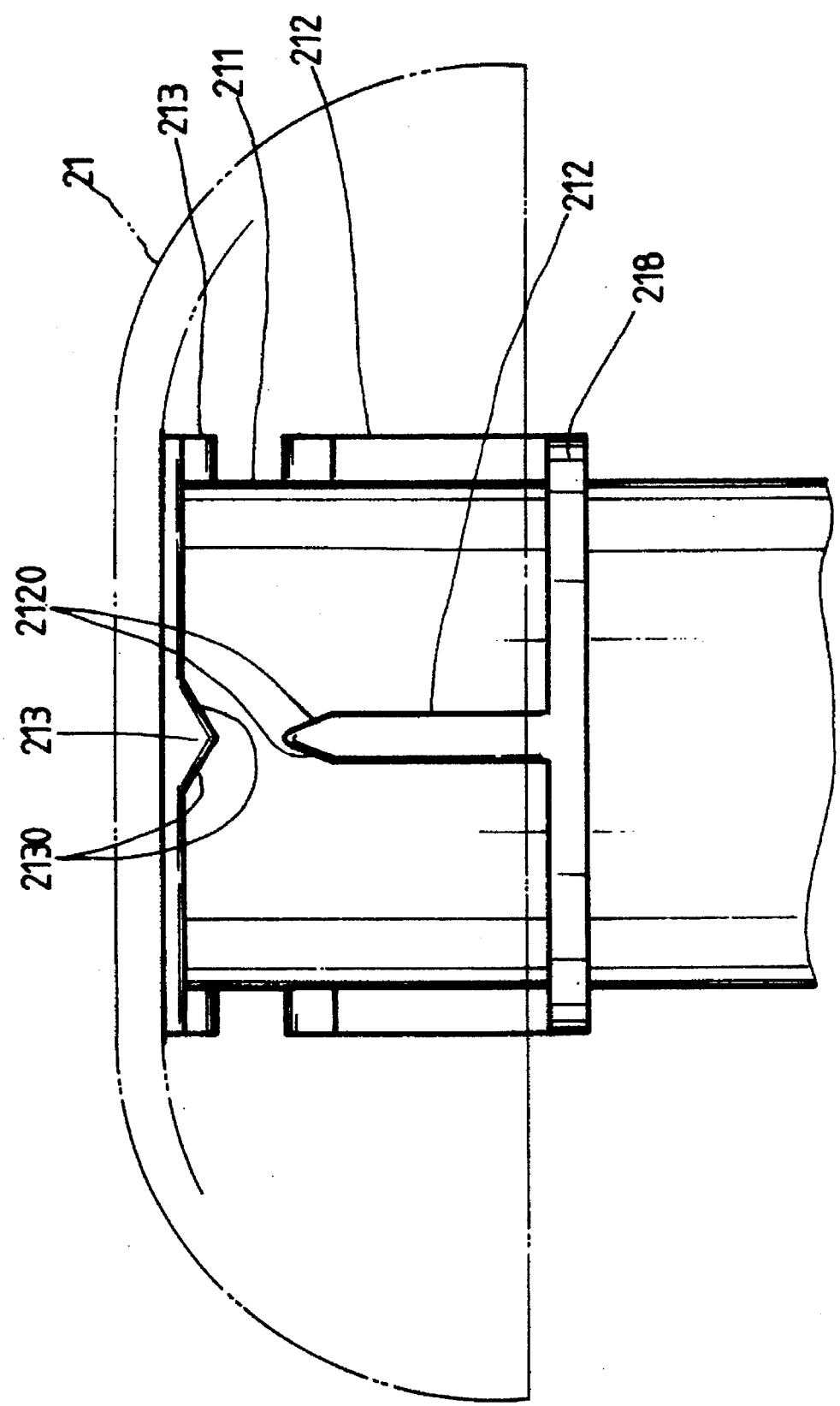
FIG. 8 is an elevational view of a retaining ring and a plurality of ribs.
Figure 11:
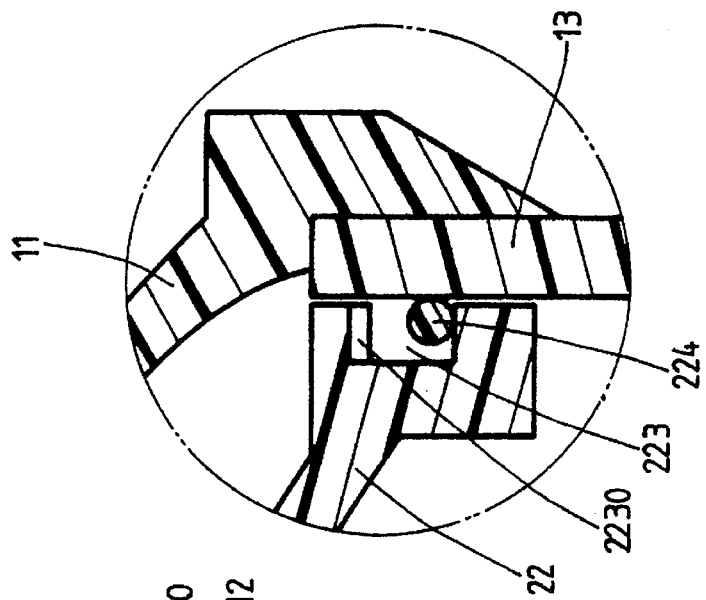
FIG. 11 is a sectional view of the third choke ring.
Figure 9:
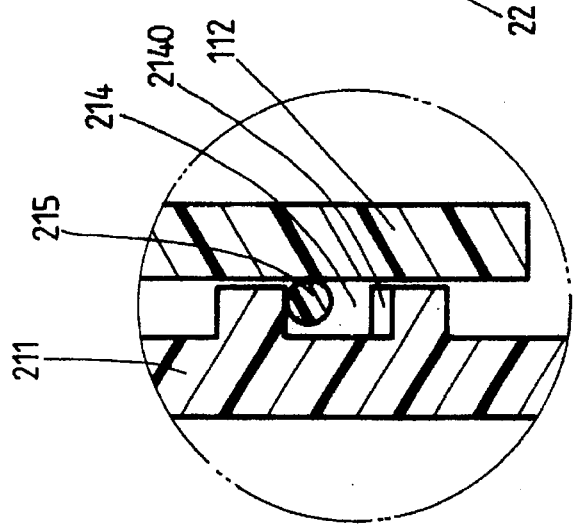
FIG. 9 is a sectional view of the first choke ring.
Figure 10:
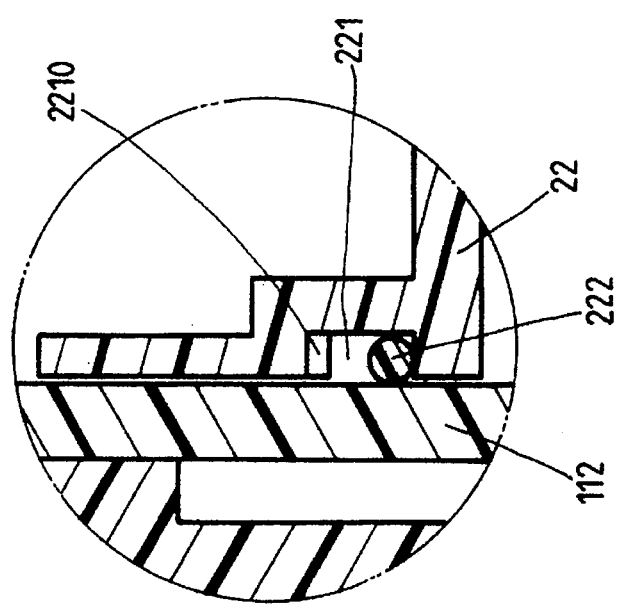
FIG. 10 is a sectional view of the second choke ring.
Figure 12:
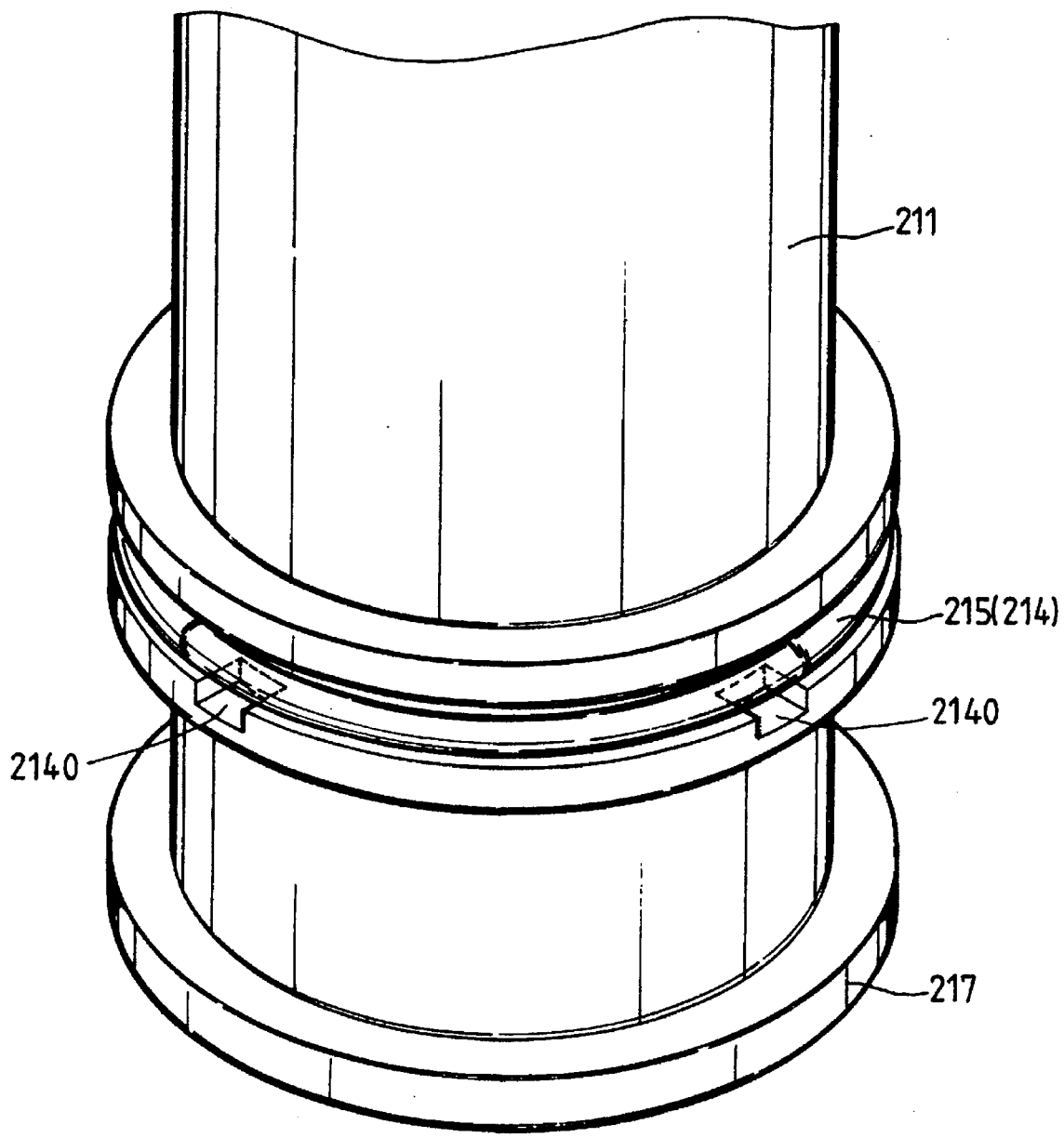
FIG. 12 is an elevational view of a cylinder seat with a lower disk and a recess ring.
Figure 13:
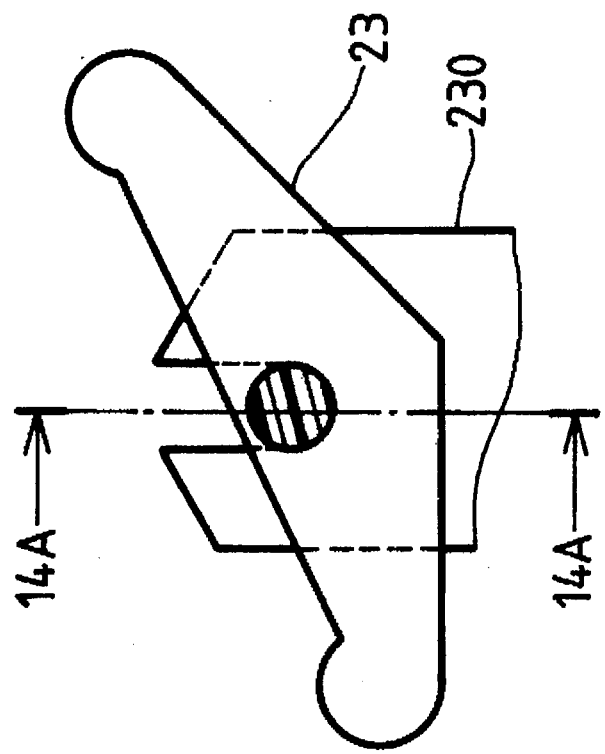
FIG. 13 is an elevational view of a slide block.
Figure 14:
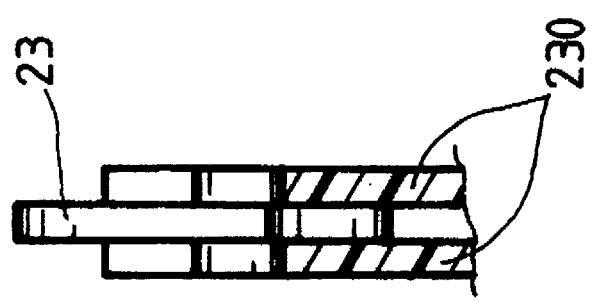
FIG. 14 is a sectional view taken along line 14A—14A in FIG. 13.

Referring to FIGS. 1 to 4, a vacuum container has a vessel 2 and an installed air extraction device covering the vessel 2. The installed air extraction device has a cap 1, an air extraction device 20 disposed in the cap 1, and an air inlet valve 30 passing through a center of the cap 1. The cap 1 has an inner cover 10, an outer cover 11, and a hollow interior 12 defined between the inner cover 10 and the outer cover 11. An extending sleeve 13 extends downward from a periphery edge of the outer cover 11 to enclose an upper rim of the vessel 2. A plurality of first vents 100 are formed on a center portion of the inner cover 10. A plurality of third vents 110 are formed on a center portion of the outer cover 11. A plurality of grooves 111 are formed on the outer cover 11 near the corresponding first vents 100 (as shown in FIGS. 1 and 7). An inner sleeve 112 extends downward from the center portion of the outer cover 11. The air extraction device 20 has a hollow press plate 21 disposed on a top of the outer cover 11, a cylinder seat 211 extending downward from the hollow press plate 21, a lower disk 217 disposed at a bottom of the cylinder seat 211, a lining cap 22 flaring downward from the cylinder seat 211 to the extending sleeve 13, a retaining ring 218 surrounding an upper portion of the cylinder seat 211 (as shown in FIGS. 1 and 8), a plurality of ribs 212 extending upward from the retaining ring 218 (as shown in FIG. 8) to abut a periphery of the cylinder seat 211, and a plurality of guide blocks 213 disposed beneath the hollow press plate 21 to face the corresponding ribs 212. Two slide blocks 23 are disposed between the inner cover 10 and the lining cap 22 pivotally. Each of the slide blocks 23 has a first end contacting the lining cap 22 and a second end contacting the lower disk 217. A first recess ring 214 surrounds the cylinder seat 211 (as shown in FIGS. 9 and 12). The first recess ring 214 has a recess to receive a first choke ring 215. The first choke ring 215 contacts the inner sleeve 112 (as shown in FIG. 9). A plurality of first air passages 2140 pass through the first recess ring 214. A hollow tube 102 extends upward from the lower disk 217. A first spring 216 is disposed between the hollow press plate 21 and the hollow tube 102. A plurality of second vents 103 are formed on a lower portion of the hollow tube 102. A second spring 220 is disposed between the outer cover 11 and the lining cap 22 to surround the inner sleeve 112. A second recess ring 221 is formed in an upper inner periphery of the lining cap 22 (as shown in FIG. 10). The second recess ring 221 has a recess to receive a second choke ring 222 (as shown in FIG. 10). The second choke ring 222 contacts the inner sleeve 112 (as shown in FIG. 10). A plurality of second air passages 2210 pass through the second recess ring 221. A third recess ring 223 is formed on an outer rim of the lining cap 22. The third recess ring 223 has a recess to receive a third choke ring 224 (as shown in FIG. 11). The third choke ring 224 contacts the extending sleeve 13. A plurality of third air passages 2230 pass through the third recess ring 223. Two support plates 230 extend upward from the inner cover 10 to support the corresponding slide blocks 23 pivotally (as shown in FIGS. 1, 13 and 14). Each of the ribs 212 has two first bevels 2120 to form an upper end. The ribs 212 are inserted in the corresponding grooves 111. Each of the guide blocks 213 has two second bevels 2130 to form a lower end. The hollow press plate 21 has a periphery flap 210. A check ring 320 is disposed beneath the hollow press plate 21. The air inlet valve 30 has a plug plate 31 disposed in a bottom end of the hollow tube 102 and a push bar 32 passing through the hollow press plate 21 and the check ring 320 to be inserted in the hollow tube 102. The check ring 320 contacts the first spring 216.

Figure 6:
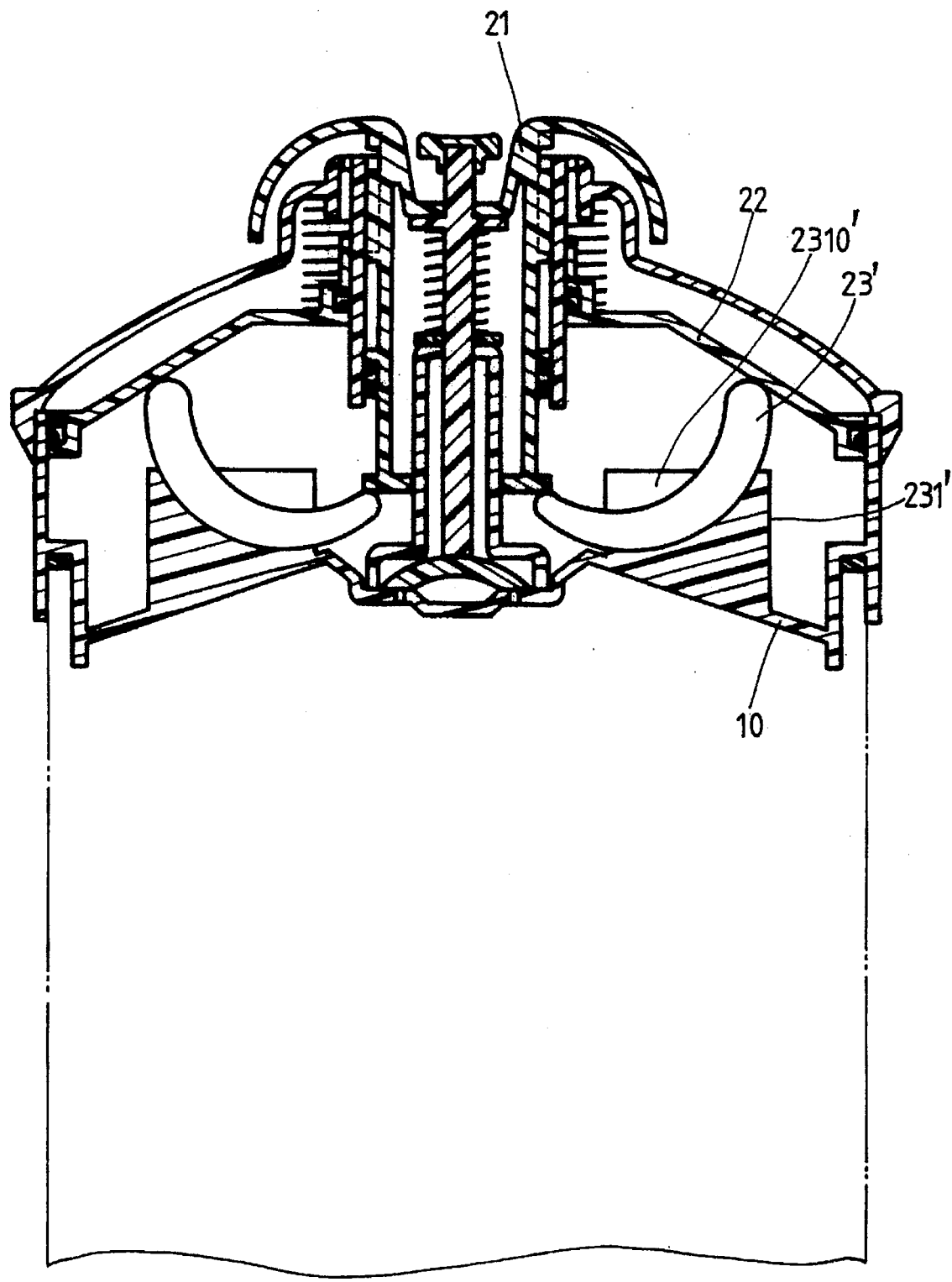
FIG. 6 is a sectional assembly view of a vacuum container with another slide block therein.

Referring to FIG. 6, two support seats 231' extend upward from the inner cover 10 to support the corresponding curved slide blocks 23' pivotally. Each of the support seats 231' has a positioning recess 2310' to receive the corresponding curved slide block 23', respectively.

Figure 5:
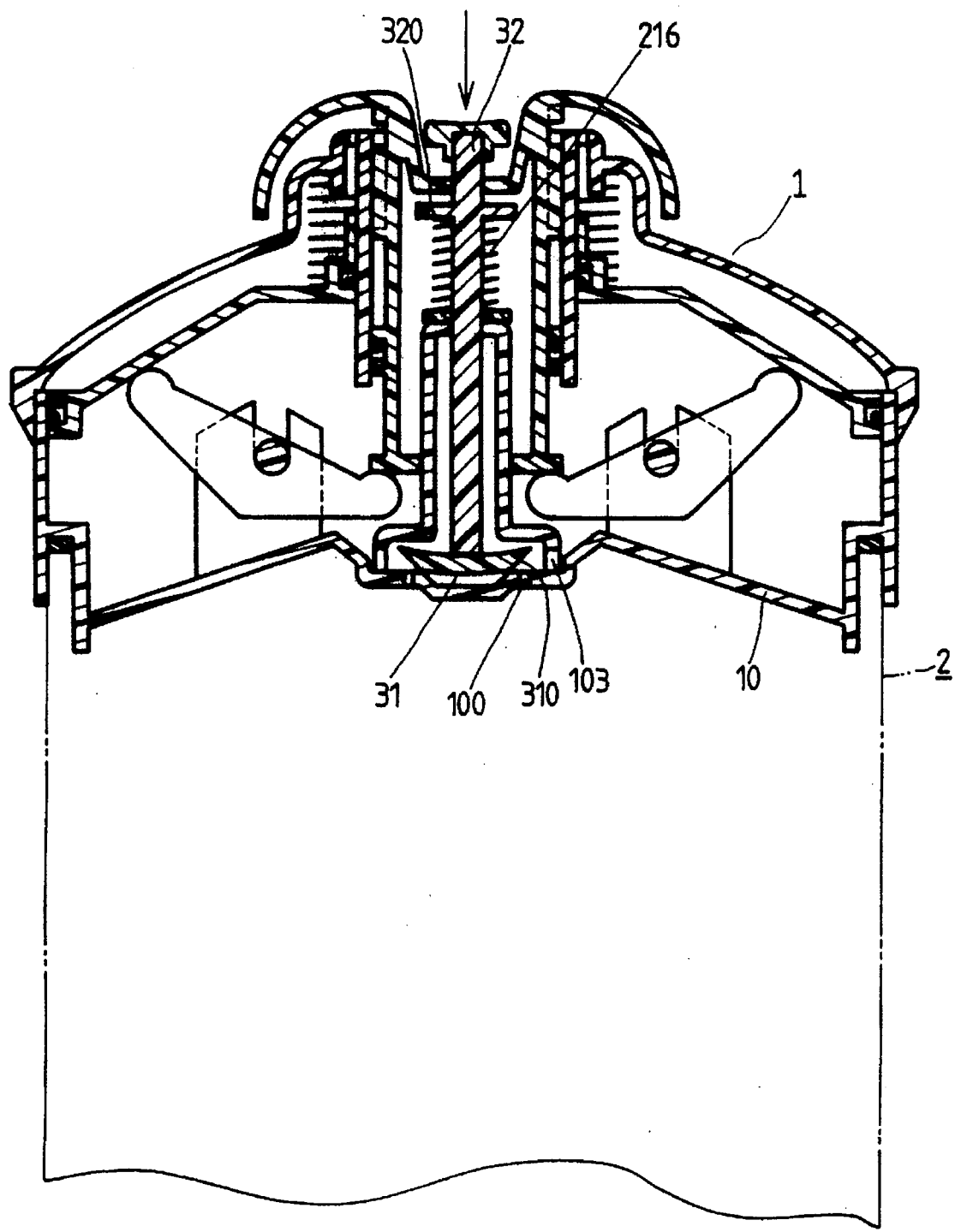
FIG. 5 is a schematic view illustrating an operation of a press plate to extract the air in the vacuum container.

Referring to FIG. 5, the push bar 32 is pressed downward in order to open the vacuum container.

Figure 2:
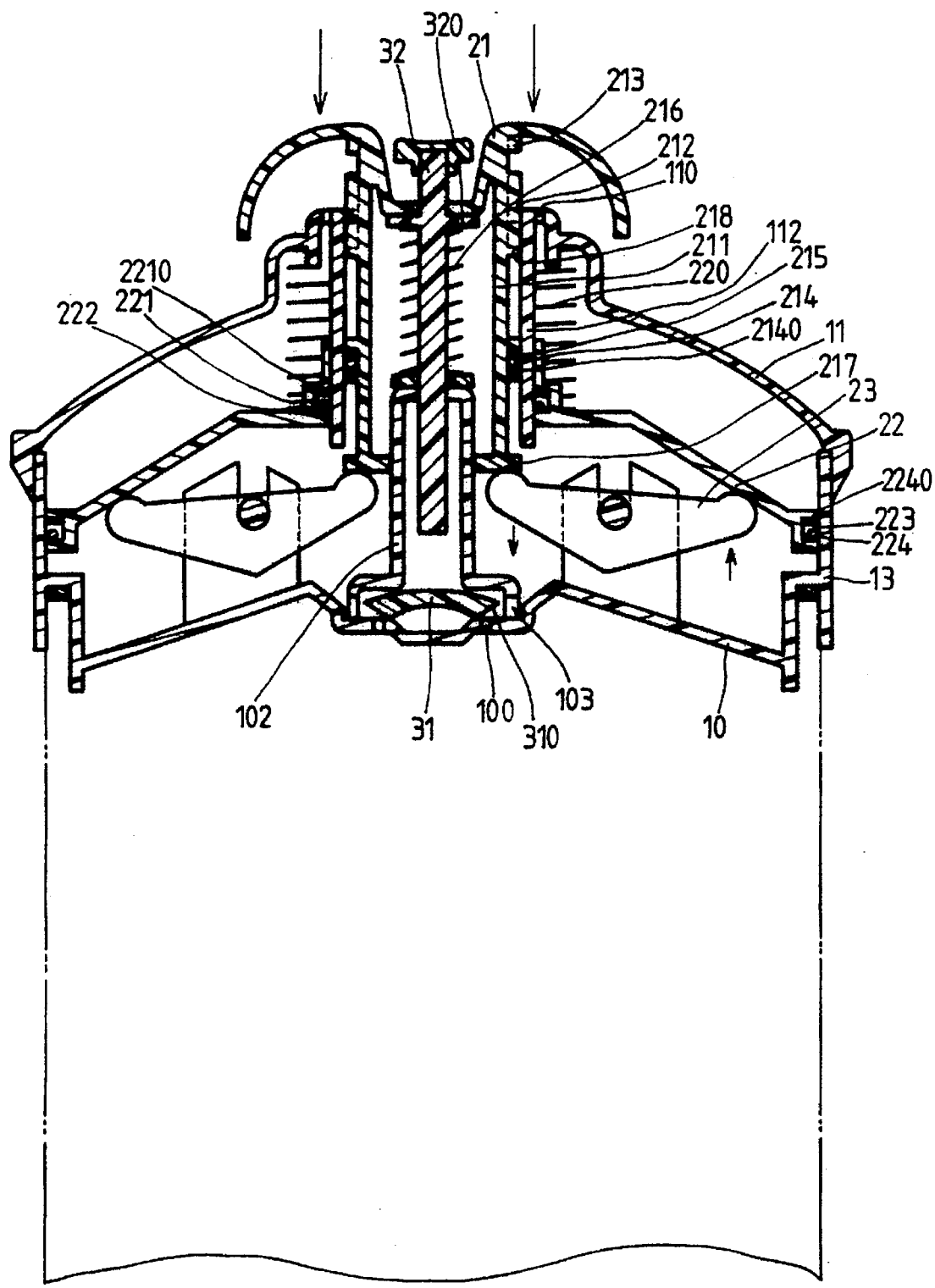
FIG. 2 is a sectional assembly view of a vacuum container of a preferred embodiment while a press plate is pressed downward.
Figure 3:
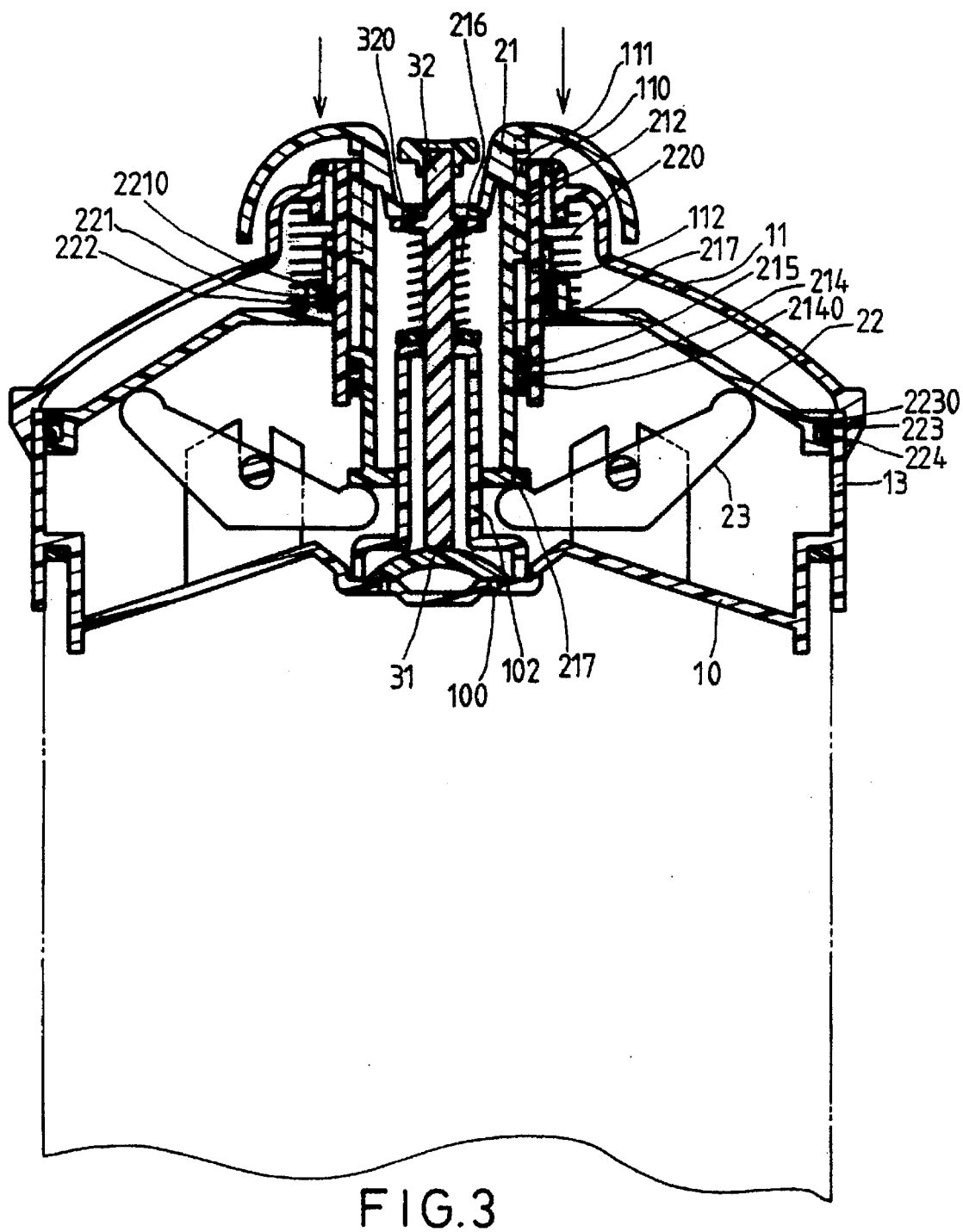
FIG. 3 is a sectional assembly view of a vacuum container of a preferred embodiment while a press plate is pressed down to the utmost.

Referring to FIG. 2, the hollow press plate 21 is pressed downward to drive the first spring 216 to move downward and the first choke ring 215 to move downward. The first choke ring 215 blocks a spacing between the inner sleeve 112 and the first recess ring 214. The ribs 212 moves downward along the corresponding grooves 111. The second end of each of the slide blocks 23 moves downward. The first end of each of the slide blocks 23 moves downward to push the lining cap 22 upward. The second choke ring 222 blocks a gap between the inner sleeve 112 and the second recess ring 221. The third choke ring 224 blocks an interval between the extending sleeve 13 and the third recess ring 223. The check ring 320 blocks a clearance between the hollow press plate 21 and the push bar 32. An upward motion of the lining cap 22 produces a suction for the air in the vessel 2. The air in the vessel 2 passes through the first vents 100 to push the plug plate 31 upward. The air enters the hollow interior 12 via the second vents 103. The plug plate 31 plugs the first vents 100 while the vessel 2 is in vacuum.

The invention is not limited to the above embodiment but various modification thereof may be made. Further, various changes in form and detail may be made without departing from the scope of the invention.

I claim:

1. A vacuum container comprising:

a vessel and an installed air extraction device covering the vessel, the installed air extraction device having a cap, an air extraction device disposed in the cap, and an air inlet valve passing through a center of the cap, the cap having an inner cover, an outer cover, and a hollow interior defined between the inner cover and the outer cover, an extending sleeve extending downward from a periphery edge of the outer cover to enclose an upper rim of the vessel, a plurality of first vents formed on a center portion of the inner cover, a plurality of third vents formed on a center portion of the outer cover, a plurality of grooves formed on the outer cover near the corresponding first vents, an inner sleeve extending downward from the center portion of the outer cover, the air extraction device having a hollow press plate disposed on a top of the outer cover, a cylinder seat extending downward from the hollow press plate, a lower disk disposed at a bottom of the cylinder seat, a lining cap flaring downward from the cylinder seat to the extending sleeve, a retaining ring surrounding an upper portion of the cylinder seat, a plurality of ribs extending upward from the retaining ring to abut a periphery of the cylinder seat, and a plurality of guide blocks disposed beneath the hollow press plate to face the corresponding ribs, two slide blocks disposed between the inner cover and the lining cap pivotally, each of the slide blocks having a first end contacting the lining cap and a second end contacting the lower disk, a first recess ring surrounding the cylinder seat, the first recess ring having a recess to receive a first choke ring, the first choke ring contacting the inner sleeve, a plurality of first air passages passing through the first recess ring, a hollow tube extending upward from the lower disk, a first spring disposed between the hollow press plate and the hollow tube, a plurality of second vents formed on a lower portion of the hollow tube, a second spring disposed between the outer cover and the lining cap to surround the inner sleeve, a second recess ring formed in an upper inner periphery of the lining cap, the second recess ring having a recess to receive a second choke ring, the second choke ring contacting the inner sleeve, a plurality of second air passages passing through the second recess ring, a third recess ring formed on an outer rim of the lining cap, the third recess ring having a recess to receive a third choke ring, the third choke ring contacting the extending sleeve, a plurality of third air passages passing through the third recess ring, two support plates extending upward from the inner cover to support the corresponding slide blocks pivotally, each of the ribs having two first bevels to form an upper end, the ribs inserted in the corresponding grooves, each of the guide blocks having two second bevels to form a lower end, the hollow press plate having a periphery flap, a check ring disposed beneath the hollow press plate, the air inlet valve having a plug plate disposed in a bottom end of the hollow tube and a push bar passing through the hollow press plate and the check ring to be inserted in the hollow tube, the check ring contacting the first spring, and wherein the hollow press plate is pressed downward to drive the first spring to move downward and the first choke ring to move downward, the first choke ring blocks a spacing between the inner sleeve and the first recess ring, the ribs moves downward along the corresponding grooves, the second end of each of the slide blocks moves downward, the first end of each of the slide blocks moves downward to push the lining cap upward, the second choke ring blocks a gap between the inner sleeve and the second recess ring, the third choke ring blocks an interval between the extending sleeve and the third recess ring, the check ring blocks a clearance between the hollow press plate and the push bar, an upward motion of the lining cap produces a suction for the air in the vessel, the air in the vessel passes through the first vents to push the plug plate upward, the air enters the hollow interior via the second vents, and the plug plate plugs the first vents while the vessel is in vacuum.

2. A vacuum container as claimed in claim 1, wherein each of said slide blocks is in a curved shape.

* * * * *